(12) United States Patent
Reeves et al.

(10) Patent No.: US 9,093,869 B2
(45) Date of Patent: Jul. 28, 2015

(54) MOTOR ROTOR BEARING WITH TEMPERATURE-ACTIVATED STABILIZERS

(71) Applicant: GE Oil & Gas ESP, Inc., Oklahoma City, OK (US)

(72) Inventors: Brian Paul Reeves, Edmond, OK (US); Chengbao Wang, Oklahoma City, OK (US); Robert Lee Marvel, Norman, OK (US)

(73) Assignee: GE Oil & Gas, ESP, Inc., Oklahoma City, OK (US)

( * ) Notice: Subject to any disclaimer, the term of this patent is extended or adjusted under 35 U.S.C. 154(b) by 201 days.

(21) Appl. No.: 13/935,395

(22) Filed: Jul. 3, 2013

(65) Prior Publication Data

US 2015/0008780 A1    Jan. 8, 2015

(51) Int. Cl.
*H02K 5/16* (2006.01)
*H02K 7/08* (2006.01)
*F16C 41/00* (2006.01)

(52) U.S. Cl.
CPC ............... *H02K 7/08* (2013.01); *F16C 41/004* (2013.01); *H02K 2213/09* (2013.01)

(58) Field of Classification Search
CPC ............................ H02K 2213/09; H02K 7/08
USPC ........................................ 310/90, 51; 384/626
See application file for complete search history.

(56) References Cited

U.S. PATENT DOCUMENTS

| | | | | |
|---|---|---|---|---|
| 5,149,206 A * | 9/1992 | Bobo | | 384/99 |
| 5,344,239 A * | 9/1994 | Stallone et al. | | 384/99 |
| 5,436,515 A * | 7/1995 | Ide | | 310/90 |
| 5,795,075 A | 8/1998 | Watson | | |
| 6,956,310 B1 * | 10/2005 | Knox | | 310/90 |
| 8,342,821 B2 * | 1/2013 | Prieto | | 417/423.12 |
| 2012/0251362 A1 | 10/2012 | Forsberg | | |

* cited by examiner

*Primary Examiner* — Hanh Nguyen
(74) *Attorney, Agent, or Firm* — Crowe & Dunlevy

(57) ABSTRACT

A bearing assembly for use in an electric motor has a temperature-activated stabilizer to reduce vibration. The electric motor has a stator assembly and a rotor assembly and the bearing assembly includes a collar that has an outer diameter that is less than an inner diameter of the stator assembly. The bearing assembly further includes a temperature-activated stabilizer assembly that includes an extensible member positioned within the stabilizer recess. Under a first temperature the extensible member has a first volume and under a second temperature the extensible member expands to a second volume that is larger than the first volume. As the extensible member expands, the extensible member comes into contact with the stator assembly.

24 Claims, 8 Drawing Sheets

MOTOR ROTOR BEARING WITH TEMPERATURE-ACTIVATED STABILIZERS

FIELD OF THE INVENTION

This invention relates generally to the field of electric motors, and more particularly, but not by way of limitation, to a rotor bearing assembly for an electric motor.

BACKGROUND

Electrodynamic systems such as electric motors, generators, and alternators typically include a stator and a rotor. The stator typically has a metallic core with electrically insulated wire winding through the metallic core to form the stator coil. When current is alternately passed through a series of coils, magnetic flux fields are formed, which cause the rotor to rotate in accordance with electromagnetic physics.

Electrical submersible pumping systems include specialized electric motors that are used to power one or more high performance pump assemblies. The motor is typically an oil-filled, high capacity electric motor that can vary in length from a few feet to nearly fifty feet, and may be rated up to hundreds of horsepower. In submersible motors, the stators usually surround the rotors, which are secured to a center shaft that is used to transfer the output of the motor. In this way, the rotor and shaft spin about a common axis inside the motionless stator.

In longer submersible motors, it may be desirable to employ a number of separate rotor sections within a single stator. Each rotor section is usually constructed from a number of thin, pressed-together pieces of material, or laminations, through which ferromagnetic rods are inserted. The shaft can be secured within the inner diameter of the rotor sections with a keyed connection or by one of several other well-known methods.

When assembling a submersible motor, bearing assemblies are typically placed between adjacent rotor sections to construct a larger rotor assembly. The shaft is outfitted with one or more wear sleeves and is then inserted into the rotor assembly. The shaft and rotor assembly are then inserted into the stator. It is important that the bearing assemblies have a clearance fit within the stator. The clearance fit facilitates the sliding of the rotor assembly into the stator.

Some bearing assemblies further include an anti-rotation key designed to prevent the bearing assemblies from rotating within the stator. There is, however, no current mechanism in the prior art for preventing relative vibrational movement between the bearing assembly and the stator. Vibration in electrical motors is principally the result of imbalance in the rotating mass of the motor rotor and shaft as well as unstable orbit of the shaft within the various bearing assemblies. Such vibrations can be detrimental to the long-term reliability of the equipment. Improvements in rotor balance may reduce the risk of such electrical failures, but cannot be reliably eliminated. Even with stable shaft orbits, high vibration has still been observed in the motor housing and other components connected to the motor housing. There is, therefore, a continued need for a mechanism for stabilizing the bearing assembly relative to the other stationary components of the submersible pump. It is to these and other deficiencies in the prior art that the present invention is directed.

SUMMARY OF THE INVENTION

In a presently preferred embodiment, the invention includes a bearing assembly for use in an electric motor that has a stator assembly and a rotor assembly. The bearing assembly includes a collar that has an outer diameter less that is less than an inner diameter of the stator assembly. The bearing assembly further includes a temperature-activated stabilizer assembly that includes an extensible member positioned within the stabilizer recess. Under a first temperature the extensible member has a first volume and under a second temperature the extensible member expands to a second volume that is larger than the first volume. As the extensible member expands, the extensible member comes into contact with the stator assembly.

In another aspect, the present invention includes an electric motor assembly that includes a motor rotor bearing with a temperature-activated stabilizer assembly. In yet another aspect, the present invention includes a pumping system that includes an electric motor that includes a motor rotor bearing with a temperature-activated stabilizer assembly.

DETAILED DESCRIPTION OF PREFERRED EMBODIMENTS

Figure 1:
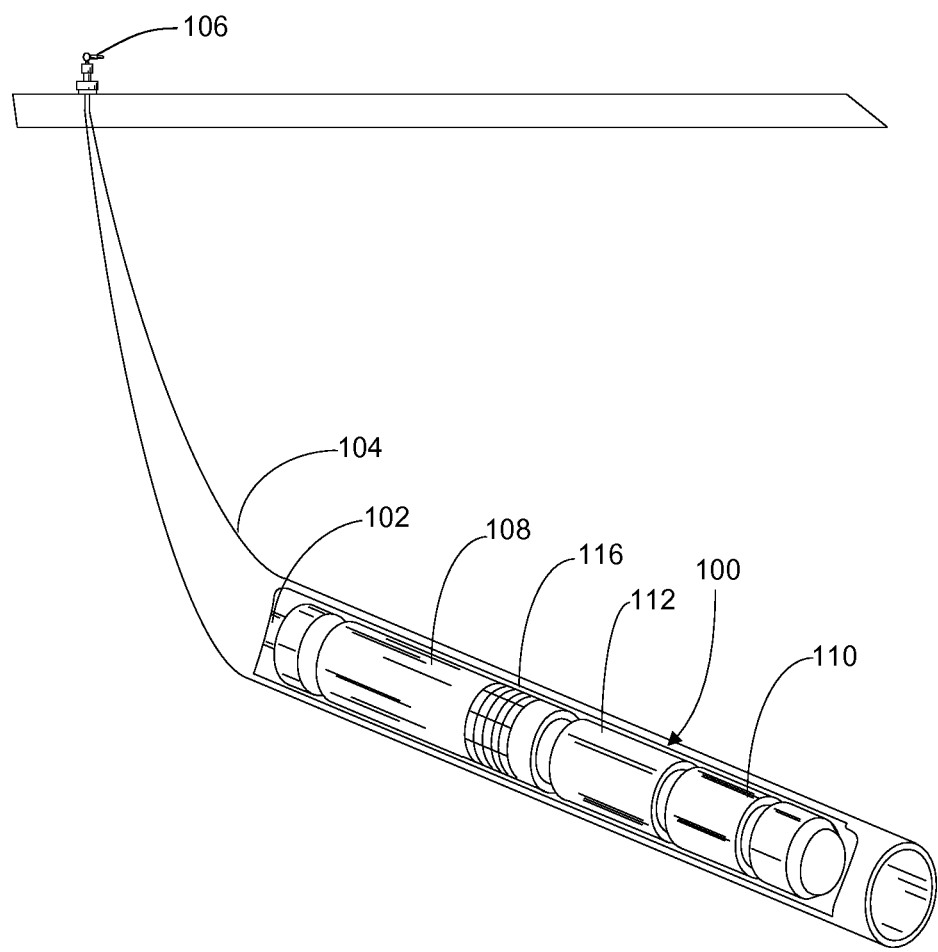
FIG. 1 is a perspective view of a downhole pumping system constructed in accordance with a presently preferred embodiment.

In accordance with a preferred embodiment of the present invention, FIG. 1 shows a perspective view of a pumping system 100 attached to production tubing 102. The pumping system 100 and production tubing are disposed in a wellbore 104, which is drilled for the production of a fluid such as water or petroleum. As used herein, the term "petroleum" refers broadly to all mineral hydrocarbons, such as crude oil, gas and combinations of oil and gas. The production tubing 102 connects the pumping system 100 to a wellhead 106 located on the surface.

The pumping system 100 preferably includes some combination of a pump assembly 108, a motor assembly 110 and a motor protector 112. The motor protector 112 isolates the motor assembly 110 from wellbore fluids produced by the pump assembly 108.

Although only one pump assembly 108 is shown, it will be understood that more than one pump assembly 108 can be connected when appropriate. The pump assembly 108 is preferably fitted with an intake section 116 to allow well fluids from the wellbore 104 to enter the pump assembly 108. The intake section 116 has holes to allow the well fluid to enter the pump assembly 108, where the well fluid is forced to the surface through the production tubing 102.

Figure 2:
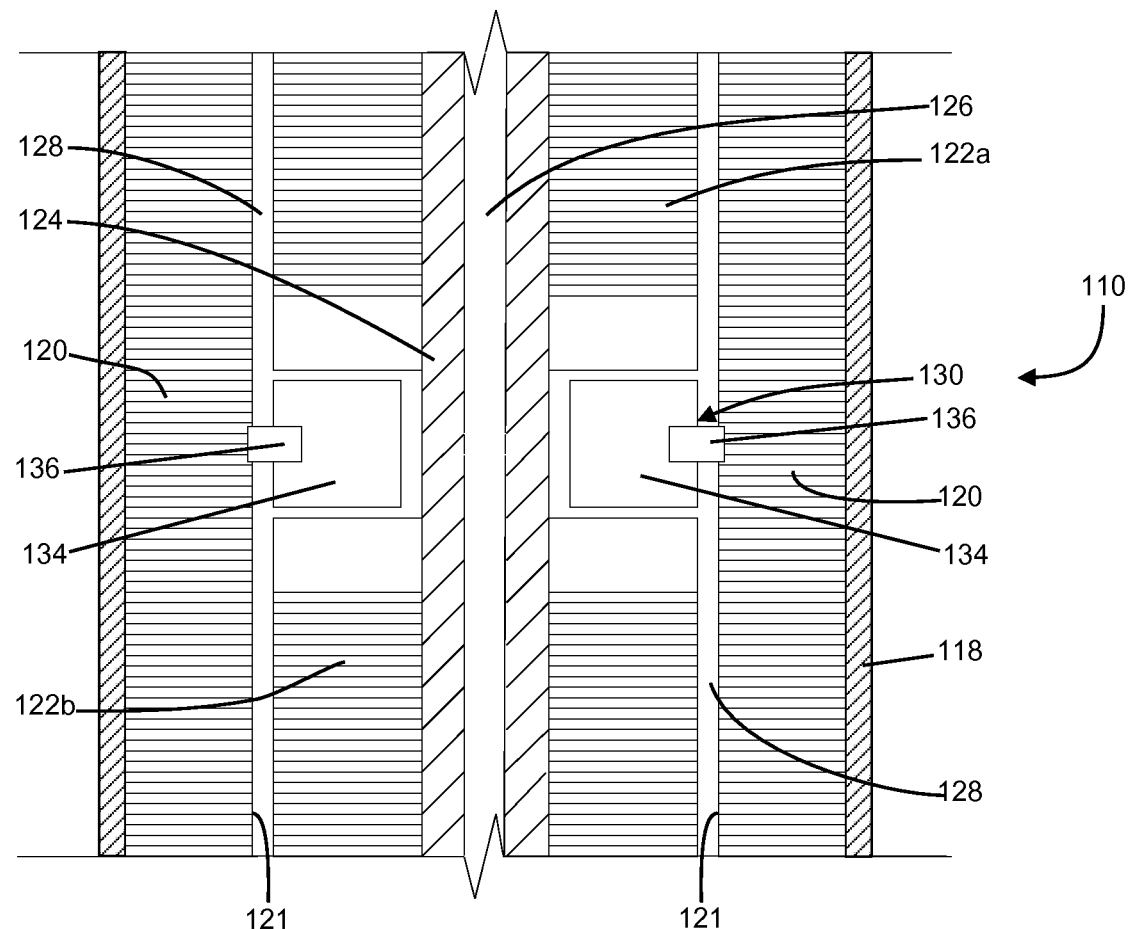
FIG. 2 is a cross-sectional view of a portion of the motor assembly of the pumping system of FIG. 1, wherein the stabilizers have a first dimension.

Referring now to FIG. 2, shown therein is a partial cross-sectional view of a portion of the motor assembly 110. The motor assembly 110 generally includes a motor housing 118, a stator assembly 120, one or more rotor assemblies 122, a shaft 124, and one or more bearing assemblies 130. The structure and interrelated function of each of these components is discussed below.

The motor housing 118 is preferably cylindrical and fabricated from a durable, anti-corrosive material. The motor housing 118 encompasses and protects the internal portions of the motor assembly 110. In certain applications, it is preferred that the motor housing 118 be fitted with flanges or other adapters for connection to adjacent downhole components (not shown in FIG. 2).

Adjacent the motor housing 118 is a stationary stator assembly 120 that remains fixed in position adjacent the motor housing 118. The stator assembly 120 is preferably constructed from a plurality of circular laminations (not separately designated) that are aligned and stacked under compression. The stator assembly 120 has an inner diameter 121. Windings (not shown) between the laminations are used to conduct electricity through the stator assembly 120. As is known in the art, electricity flowing through the stator assembly 120 according to predefined commutation states creates a rotating magnetic field.

The shaft 124 extends substantially the length of the motor assembly 110 and transfers the motion generated by the motor assembly 110 to the pump assembly 108 through the motor protector 112. The shaft 124 includes an axially oriented lubricant channel 126 that is connected to a motor lubricant reservoir (not shown) at the bottom of the motor assembly 110. The lubricant channel 126 is configured to permit the flow of motor lubricant from the lubricant reservoir through the shaft 124.

Two rotor assemblies 122 (individually designated as 122a and 122b) are shown in FIG. 2. It will be understood, however, that the number and configuration of rotor assemblies 122 can vary depending on the particular requirements of the motor assembly 110. For example, several rotor assemblies 122 with different lengths can be used within a single motor assembly 110. Like the stator assembly 120, the rotor assemblies 122 preferably include a plurality of laminations (not separately designated) that are aligned and stacked.

The bearing assembly 130 is positioned between the rotor assemblies 122a, 122b. The bearing assembly 130 limits the radial movement of the rotor assemblies 122a, 122b while providing a reduced coefficient of friction at the interface between the bearing assembly 130 and the respective rotor assemblies 122a, 122b. In a particularly preferred embodiment, the bearing assembly 130 is a hydrodynamic bearing that supports the rotor assemblies 122a, 122b on a thin fluid film.

Figure 3A:
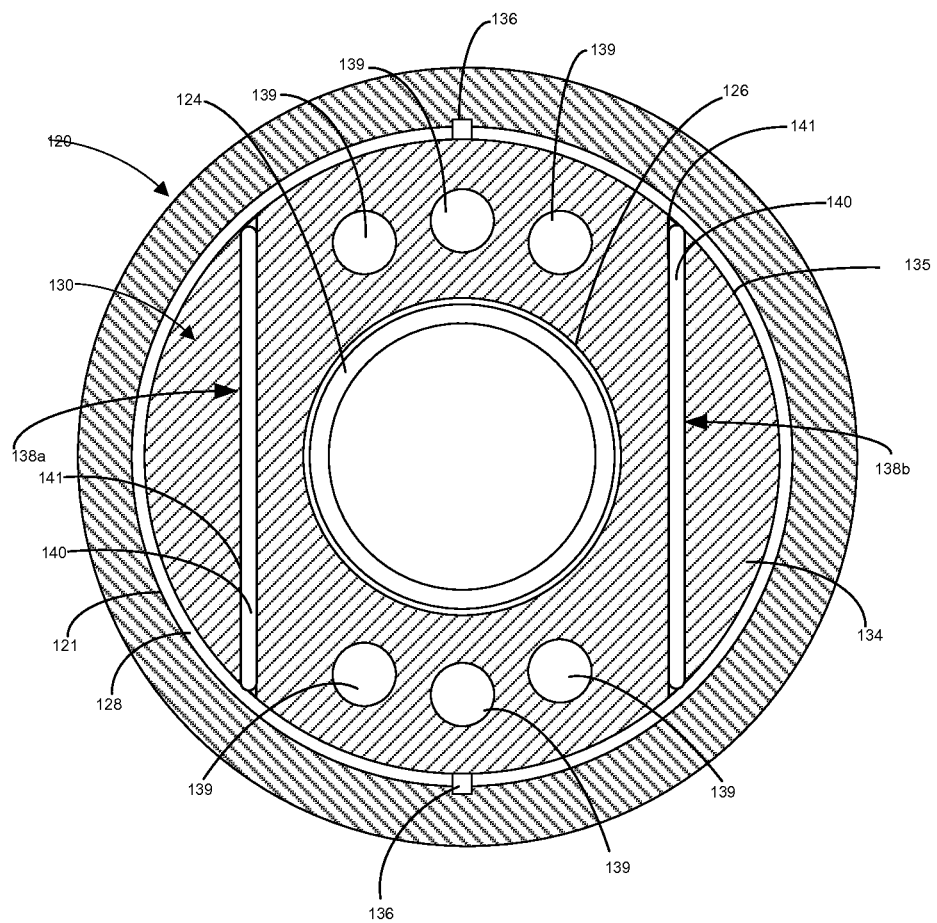
FIG. 3A is a top cross-sectional view of a first preferred embodiment of the bearing assembly within the stator assembly of the motor assembly of FIG. 2, wherein the stabilizers have a first dimension.
Figure 3B:
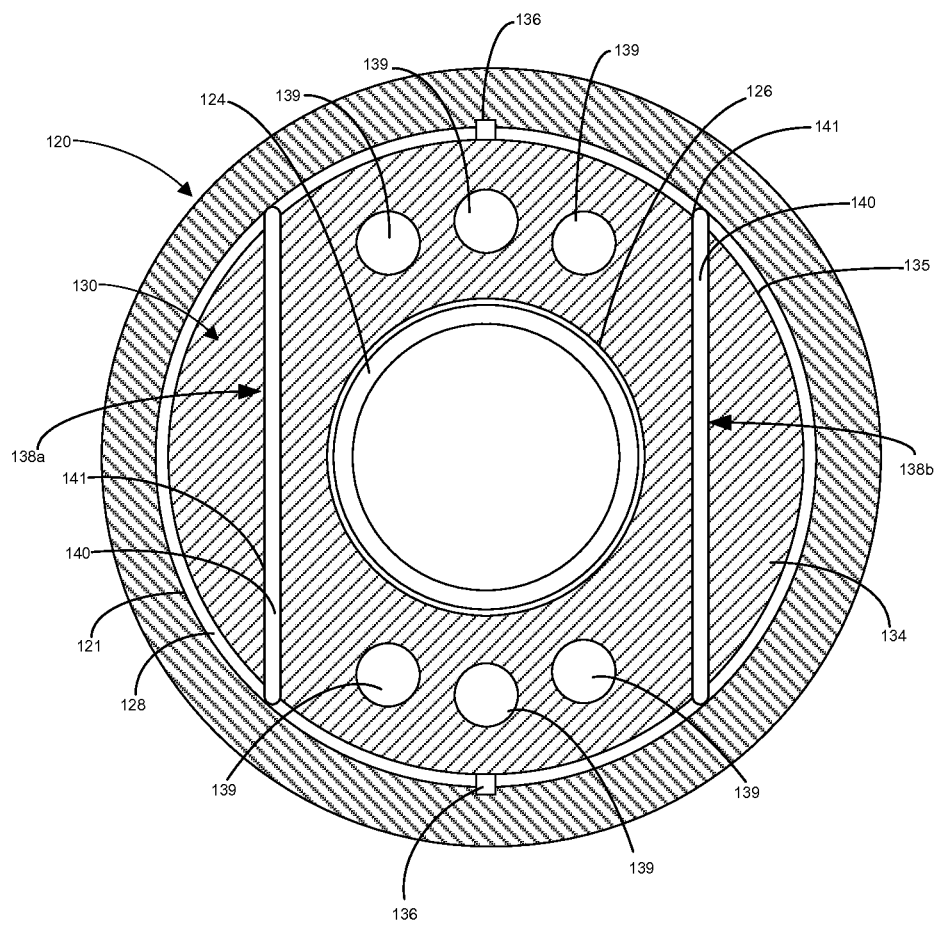
FIG. 3B is a top cross-sectional view of a first preferred embodiment of the bearing assembly within the stator assembly of the motor assembly of FIG. 2, wherein the stabilizers have a second dimension.

Continuing with FIG. 2, but referring now also to the top cross-sectional views in FIGS. 3A and 3B, the bearing assembly includes a bearing collar 134, a key 136, stabilizers 138a, 138b and a plurality of lubrication communication holes 139.

The bearing collar 134 has an outer diameter 135 that is less than the inner diameter 121. The difference between the outer diameter 135 of the bearing collar 134 and the inner diameter 121 of the stator assembly 120 forms an annulus 128.

The bearing assembly 130 is preferably secured to the stator assembly 120 by one or more keys 136, which are positioned within mating keyways formed in the laminations of the stator assembly 120. The keys 136 are designed to prevent the bearing assembly 130 from rotating during use.

In preferred embodiments, the stabilizers 138a, 138b include an extensible member 140 and a stabilizer recess 141. The extensible member 140 is preferably constructed from a material with a low yield strength and relatively high coefficient of thermal expansion that permits the extensible member 140 to have a first dimension at a first temperature and a second dimension at a second temperature. In particularly preferred embodiments, the extensible member 140 is constructed from a polyether ether ketone ("PEEK") plastic that exhibits about a 6% increase in volume when exposed to temperatures in excess of about 450° F.

In the embodiment depicted in FIG. 3A, the stabilizer recesses 141 are presented as a pair of substantially parallel bores extending through the bearing collar 134. During manufacture, the extensible member 140 is placed within a corresponding stabilizer recess 141. The extensible member 140 preferably has an outer diameter that is slightly larger than the diameter of the corresponding stabilizer recess 141. This provides a tight, interference fit during manufacture carried out at room temperatures. The length of the extensible member 140 at room temperature is configured to be approximately the same length as the corresponding stabilizer recess 141. At room temperatures and during assembly, the extensible member 140 remains confined within the stabilizer recess 141 to permit the facilitated assembly of the bearing assembly 130 within the stator assembly 120.

Turning now to FIG. 3B, shown therein is a cross-sectional view of the bearing assembly 130 and stator assembly 120 at an operating temperature of the motor assembly 110. As show in FIG. 3B, the extensible member 140 expands at the elevated operating temperatures produced by the motor assembly 110 and protrudes from the stabilizer recess 141 to contact the stator assembly 120. The extensible member 140 restricts relative motion between the bearing assembly 130 and the stator assembly 120.

Figure 4A:
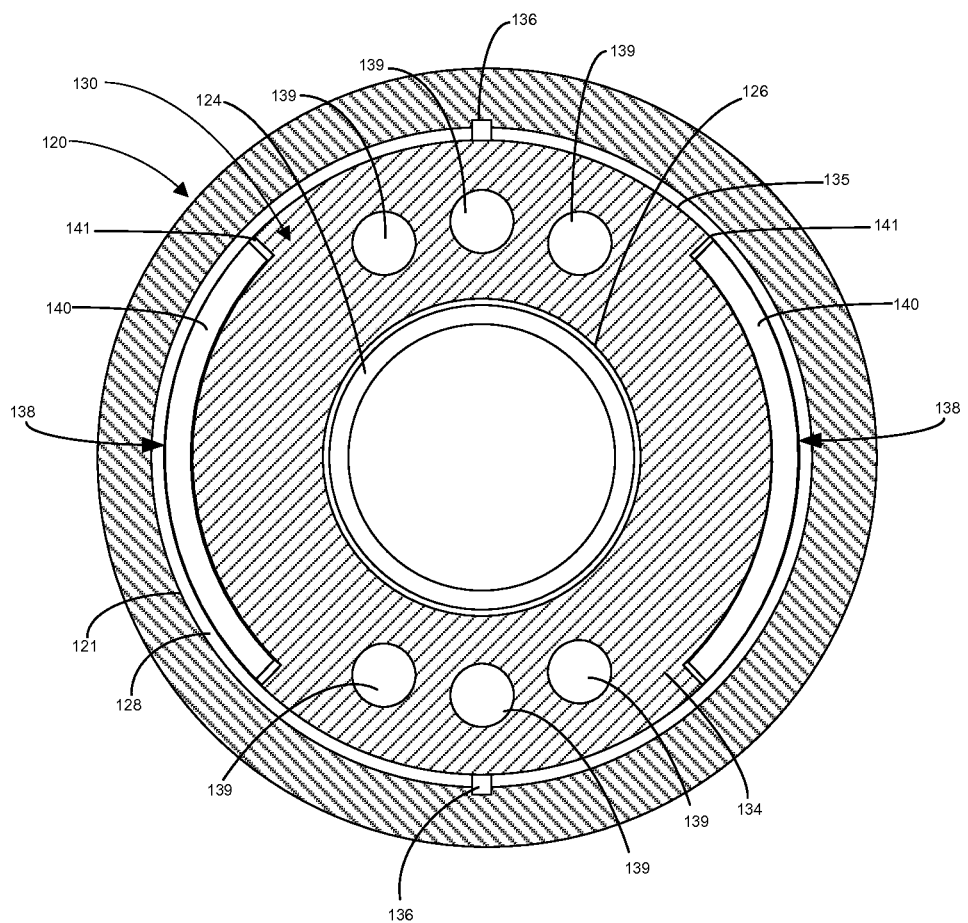
FIG. 4A is a top cross-sectional view of a second preferred embodiment of the bearing assembly within the stator assembly of the motor assembly of FIG. 2, wherein the stabilizers have a first dimension.
Figure 4B:
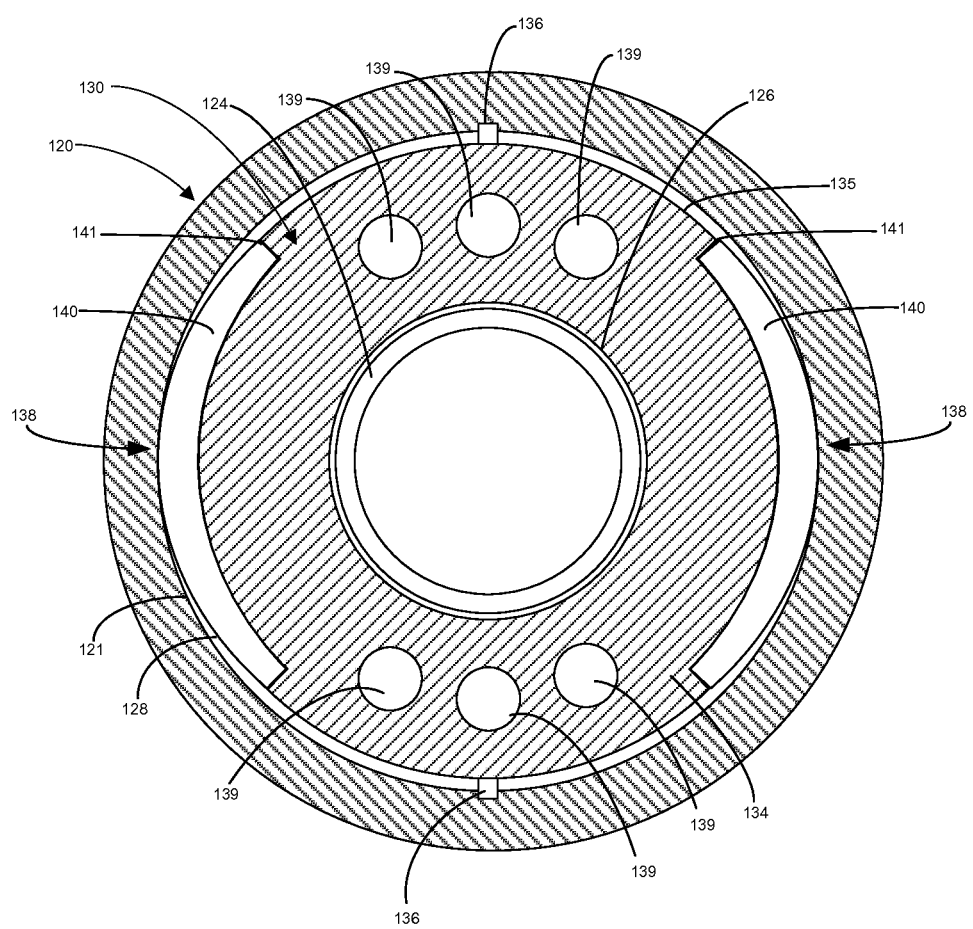
FIG. 4B is a top cross-sectional view of a second preferred embodiment of the bearing assembly within the stator assembly of the motor assembly of FIG. 2, wherein the stabilizers have a second dimension.

Turning to FIGS. 4A and 4B, shown therein are cross-sectional views of a second preferred embodiment of the bearing assembly 130 and the stator assembly 120. In the second preferred embodiment, the stabilizer recess 141 is presented as one or more arcuate recesses milled into the outer circumference of the bearing collar 134. The extensible member 140 is captured within the arcuate recess 141. Although the extensible member 140 can be configured for a press-fit engagement with the arcuate recess 141, it may be desirable to secure the extensible member 140 within the arcuate recess 141 with a suitable adhesive. At elevated temperatures, the extensible member 140 expands and comes into contact with the interior wall of the stator assembly 120.

Figure 5A:
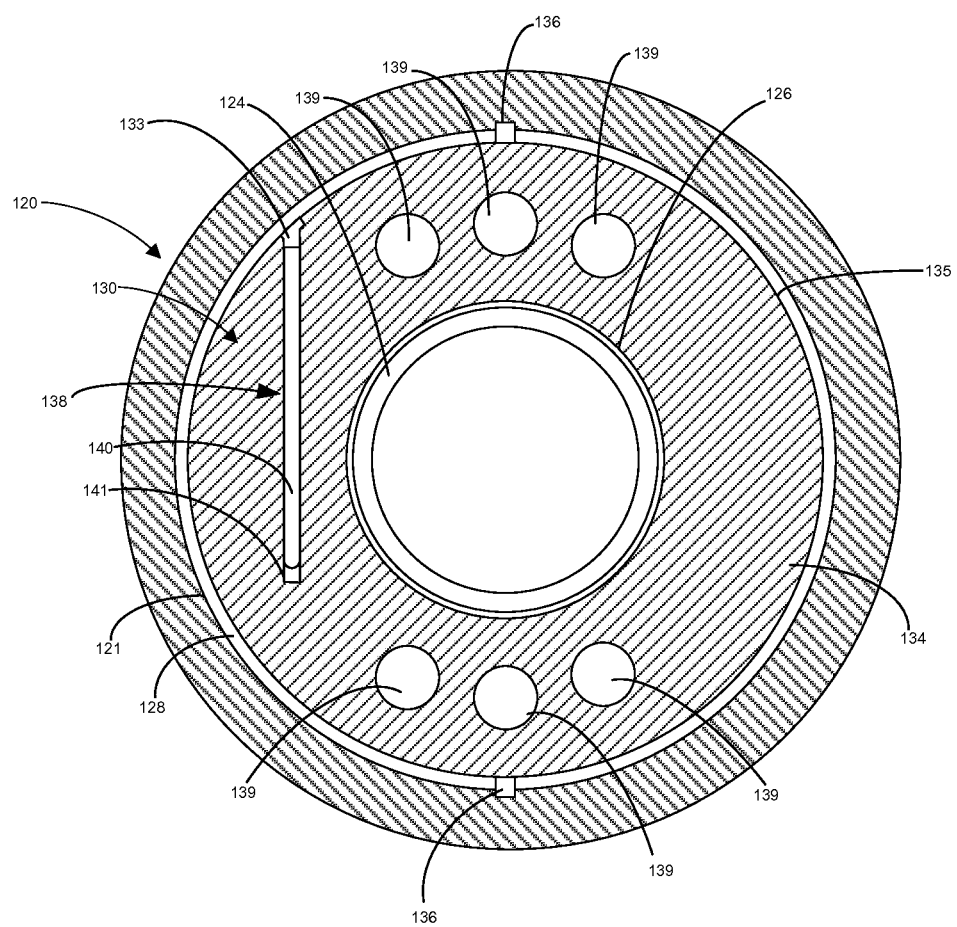
FIG. 5A is a top cross-sectional view of a third preferred embodiment of the bearing assembly within the stator assembly of the motor assembly of FIG. 2, wherein the stabilizers have a first dimension.
Figure 5B:
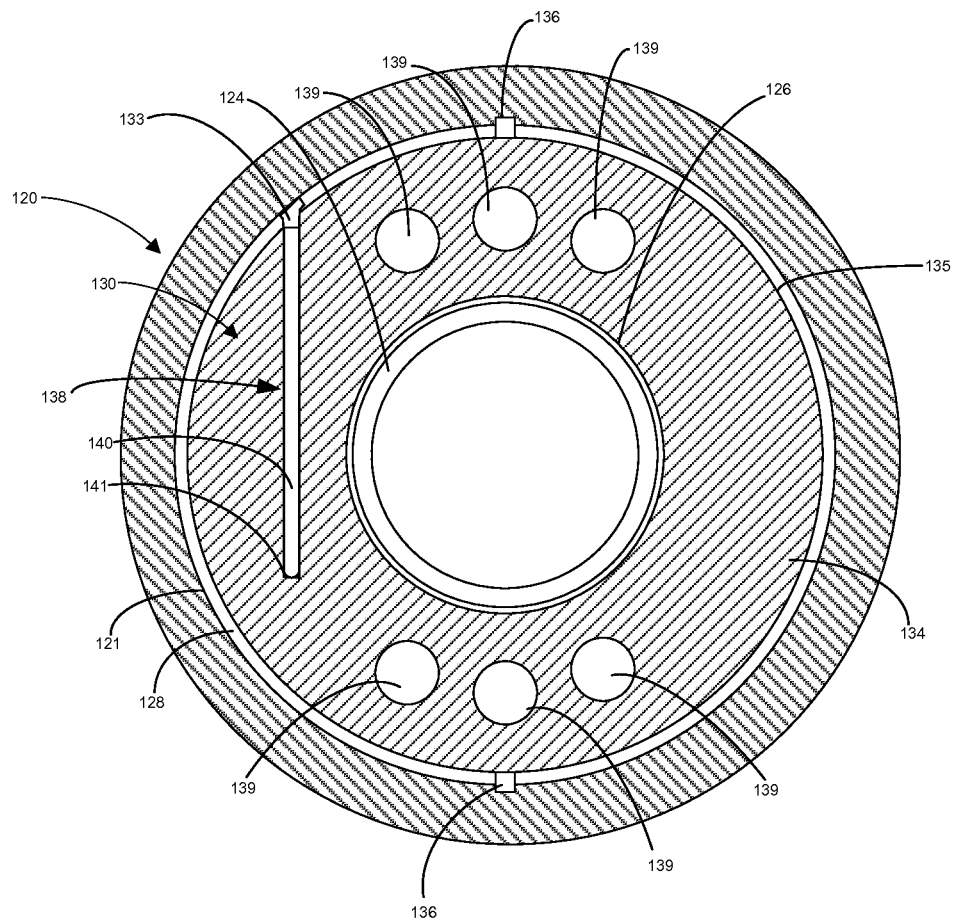
FIG. 5B is a top cross-sectional view of a third preferred embodiment of the bearing assembly within the stator assembly of the motor assembly of FIG. 2, wherein the stabilizers have a second dimension.

Turning to FIGS. 5A and 5B, shown therein is a third preferred embodiment of the bearing assembly and the stator assembly 120. In this third preferred embodiment, the bearing assembly 130 includes a single stabilizer 138. The single stabilizer 138 includes a stabilizer recess 141 that is presented as a "blind" bore that terminates within the bearing collar 134. The extensible member 140 is sized and configured to be captured within the stabilizer recess 141 at room temperature. The stabilizer 138 optionally includes a shoe 133 secured to a distal end of the extensible member 140. The shoe 133 is preferably constructed from a yield-resistant material, such as stainless steel, bronze, or hardened plastic. At operating temperatures of the motor assembly 110, the extensible member 140 extends and presses the shoe 133 against the stator assembly 120, as depicted in FIG. 5B.

It will be understood that the third preferred embodiment allows for the bearing assembly 130 to be laterally offset relative to the longitudinal axis of the motor assembly 110. In this way, at motor operating temperatures, the extension of the stabilizer 138 can be used to preload a lateral force onto the shaft 124 in a selected direction to control shaft orbit. It will be further understood that by alternating the direction of the directional offset produced by stabilizers 138 in adjacent bearing assemblies 130, the bearing assemblies 130 can be selectively and cooperatively side-loaded to further stabilized the shaft orbit along a length of the shaft 124.

Although discrete features have been disclosed in each of the preferred embodiments identified herein, it is contemplated that combinations of these features may be incorporated into a single bearing assembly 130. As a first example, it may be desirable to incorporate the use of an extensible member 140 with a shoe 133 from the third preferred embodiment (FIGS. 5A and 5B) on each of the extensible members 140 disclosed in the first preferred embodiment (FIGS. 3A and 3B). As a second example, it may be desirable to incorporate a combination of the arcuate-shaped extensible members 140 from the second preferred embodiment (FIGS. 4A and 4B) with the linearly expanding extensible members 140 from the first or third preferred embodiments. Furthermore, it is contemplated that within a single motor assembly 110, it may be desirable to employ bearing assemblies 130 that incorporate different variations of the stabilizer 138. By selecting differently designed stabilizers 138 and different orientations of the stabilizers 138, the bearing assemblies 130 can be configured to precisely load the shaft 124 to reduce vibration and unwanted play.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A bearing assembly for use in an electric motor having a stator assembly and a rotor assembly, the bearing assembly comprising:
   a collar having an outer diameter less than an inner diameter of the stator assembly; and
   a stabilizer assembly, wherein the stabilizer assembly comprises:
      a stabilizer recess formed within the collar; and
      an extensible member positioned within the stabilizer recess, wherein under a first temperature the extensible member has a first volume and wherein under a second temperature the extensible member expands to a second volume that is larger than the first volume.

2. The bearing assembly of claim 1, further comprising a clearance between the extensible member and the stator assembly, wherein the clearance is reduced as the extensible member expands to the second volume.

3. The bearing assembly of claim 2, wherein the clearance is eliminated as the extensible member expands to the second volume.

4. The bearing assembly of claim 1, wherein the first temperature is room temperature and the second temperature is an operating temperature of the electric motor.

5. The bearing assembly of claim 1, wherein the extensible member comprises a material that exhibits a higher thermal expansion capacity than the material of the stabilizer recess.

6. The bearing assembly of claim 5, wherein the extensible member comprises a material selected from the group consisting of polyether ether ketone plastic thermoset polymers, polyester, polyimide, and bronze.

7. The bearing assembly of claim 6, wherein the extensible member comprises a polyether ether ketone plastic.

8. The bearing assembly of claim 7, wherein the extensible member exhibits about a 6% increase in volume when exposed to an increase in temperature from 70° F. to about 450° F.

9. The bearing assembly of claim 8, wherein the extensible member is captured within the arcuate recess.

10. The bearing assembly of claim 1, wherein the stabilizer recess comprises a bore that extends entirely through the collar.

11. The bearing assembly of claim 10, wherein the extensible member is secured within the arcuate recess with an adhesive.

12. The bearing assembly of claim 11, wherein the shoe comprises a wear-resistant material selected from the group consisting of stainless steel, bronze or hardened plastic.

13. The bearing assembly of claim 1, wherein the stabilizer recess comprises an arcuate recess milled into the outer circumference of the bearing collar.

14. The bearing assembly of claim 1, wherein the stabilizer recess comprises a blind bore that terminates within the bearing collar.

15. The bearing assembly of claim 1, wherein the stabilizer further comprises a shoe at the end of the extensible member.

16. The bearing assembly of claim 1, further comprising a plurality of stabilizer assemblies.

17. An electric motor assembly comprising:
   a stator assembly;
   a shaft;
   a plurality of rotor assemblies positioned within the stator assembly and connected to the shaft; and
   at least one bearing assembly positioned between adjacent ones of the plurality of rotor assemblies, wherein the bearing assembly comprises:
      a collar having an outer diameter less than an inner diameter of the stator assembly; and
      a stabilizer assembly, wherein the stabilizer assembly comprises:
         a stabilizer recess formed within the collar; and
         an extensible member positioned within the stabilizer recess, wherein under a first temperature the extensible member has a first volume and wherein under a second temperature the extensible member expands to a second volume.

18. The electric motor assembly of claim 17, wherein the first temperature is room temperature and the second temperature is an operating temperature of the electric motor assembly.

19. The electric motor assembly of claim 17, wherein the extensible member comprises a polyether ether ketone plastic.

20. The electric motor assembly of claim 17, further comprising a plurality of stabilizer assemblies.

21. A pumping system comprising:
a pump assembly;
an electric motor assembly configured to drive the pump assembly, wherein the electric motor assembly further comprises:
a stator assembly;
a shaft;
a plurality of rotor assemblies positioned within the stator assembly and connected to the shaft; and
at least one bearing assembly positioned between adjacent ones of the plurality of rotor assemblies, wherein the bearing assembly comprises:
a collar having an outer diameter less than an inner diameter of the stator assembly; and
a stabilizer assembly, wherein the stabilizer assembly comprises:
a stabilizer recess formed within the collar; and
an extensible member positioned within the stabilizer recess, wherein under a first temperature the extensible member has a first volume and wherein under a second temperature the extensible member expands to a second volume.

22. The pumping system of claim 21, wherein the first temperature is room temperature and the second temperature is an operating temperature of the electric motor assembly.

23. The pumping system of claim 21, wherein the extensible member comprises a polyether ether ketone plastic.

24. The pumping system of claim 21, further comprising a plurality of stabilizer assemblies.

* * * * *